United States Patent
Feldman et al.

[11] Patent Number: 5,963,332
[45] Date of Patent: *Oct. 5, 1999

[54] INTERNAL COLOR PROBE

[75] Inventors: Sandra Freedman Feldman, Schenectady; Carl Murray Penney, Saratoga Springs, both of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/915,288

[22] Filed: Aug. 20, 1997

[51] Int. Cl.$^6$ .................................................. G01J 3/50
[52] U.S. Cl. ............................... 356/425; 356/407
[58] Field of Search ........................... 356/402, 405, 356/425, 406, 407, 408, 409, 410

[56] References Cited

U.S. PATENT DOCUMENTS

| | | | |
|---|---|---|---|
| 4,575,249 | 3/1986 | Grieger | 356/369 |
| 4,878,756 | 11/1989 | Stauffer | 356/406 |
| 5,559,173 | 9/1996 | Campo et al. | 523/303 |

OTHER PUBLICATIONS

*Fundamentals of Optics*, 1976, pp. 500–502.

*Primary Examiner*—Frank G. Font
*Assistant Examiner*—Zandra V. Smith
*Attorney, Agent, or Firm*—Marvin Snyder; Douglas E. Stoner

[57] ABSTRACT

A probe is configured for measuring color in a sample of material having a refractive index. The probe includes a light source that emits a light beam toward the sample. A color sensor is disposed at an oblique angle with the light source and directed toward a common probe zone for containing the sample. The light source and sensor are optically aligned with a reference plane in the probe zone to effect angles of incidence and reflection relative to the zone having a magnitude substantially equal to Brewster's maximum polarization angle for the refractive index of the sample, for measuring interior color of the sample.

10 Claims, 3 Drawing Sheets

5,963,332

INTERNAL COLOR PROBE

BACKGROUND OF THE INVENTION

This invention relates to the production of colored polymers, and, more specifically, to measuring color thereof.

Modern plastics are typically formed of one or more base polymers or resins, one or more colorants, and other additives including, for example, fiberglass for structural reinforcement, flame retardants, plasticizers, or mold release agents. The plastics are manufactured by initially mixing these components, usually by machine, to form a substantially homogeneous polymer mixture or blend. The blend then undergoes extrusion to form a raw product which may be in the exemplary form of pellets which are in turn used by manufacturers to produce final, finished polymer products of various forms and configurations.

Experience has shown that the color of the final product may depend on several factors including the concentration and type of colorant and base resin, temperature history during mixing, and the ultimate degree of constituent intermixing achieved during processing. Thus, variations in color between otherwise similar polymer products may arise for a variety of reasons.

For example, color may vary among polymer products due to polymer product formulation or recipe differences. Color variations may exist between lots for a given product formulation or recipe due to machine-to-machine differences. Color differences may exist within lots due to changing raw material characteristics, changing operating conditions, and inaccuracies and other anomalies in processing including speed rates.

Plastics including thermoplastic or thermoset polymers may be used in various commercial products. Typical industries include printing, painting, fabrics, and plastics, wherein accurate color of the final polymer product is important.

Polymer color is typically adjusted by adjusting the amount of colorant for a given production run. The colorant may take any conventional form which affects the color of the polymer product by itself or in combination with other constituents. For example, solid pigments and liquid pigments or dyes may be used for effecting the color of the final product.

In a typical production process, the colorant and base resin are blended together and compounded or extruded in a laboratory machine to generate pellets. The pellets are then injection molded to obtain a plaque with substantially uniform color, which is then conventionally measured in a laboratory spectrocolorimeter. The measured plaque color is compared with a reference or standard plaque color, and differences therebetween are corrected by adjusting the colorant. The sequence is repeated until the plaque color falls within an acceptable range to the reference plaque.

A sample of the finally corrected colorant and resin blend is then compounded on a production scale machine which follows a similar procedure as the laboratory machine to produce a color plaque which is again compared with the reference plaque. If required, the colorant in the production machine is suitably corrected to effect an acceptable match between the measured plaque and the reference plaque.

This process, therefore, requires many steps to achieve a desired color in the polymer pellets which increases processing time and cost.

Accordingly, it is desired to improve the process of measuring and adjusting color in the production of a polymer product from base resins and colorants.

SUMMARY OF THE INVENTION

A probe is configured for measuring color in a sample having a refractive index. The probe includes a light source for emitting a light beam toward the sample. A color sensor is disposed obliquely with the light source toward a common probe zone for receiving the sample therein. The light source and sensor are optically aligned with a reference plane in the probe zone to effect angles of incidence and reflection relative thereto having a magnitude substantially equal to Brewster's maximum polarization angle for the refractive index of the sample for measuring internal color thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
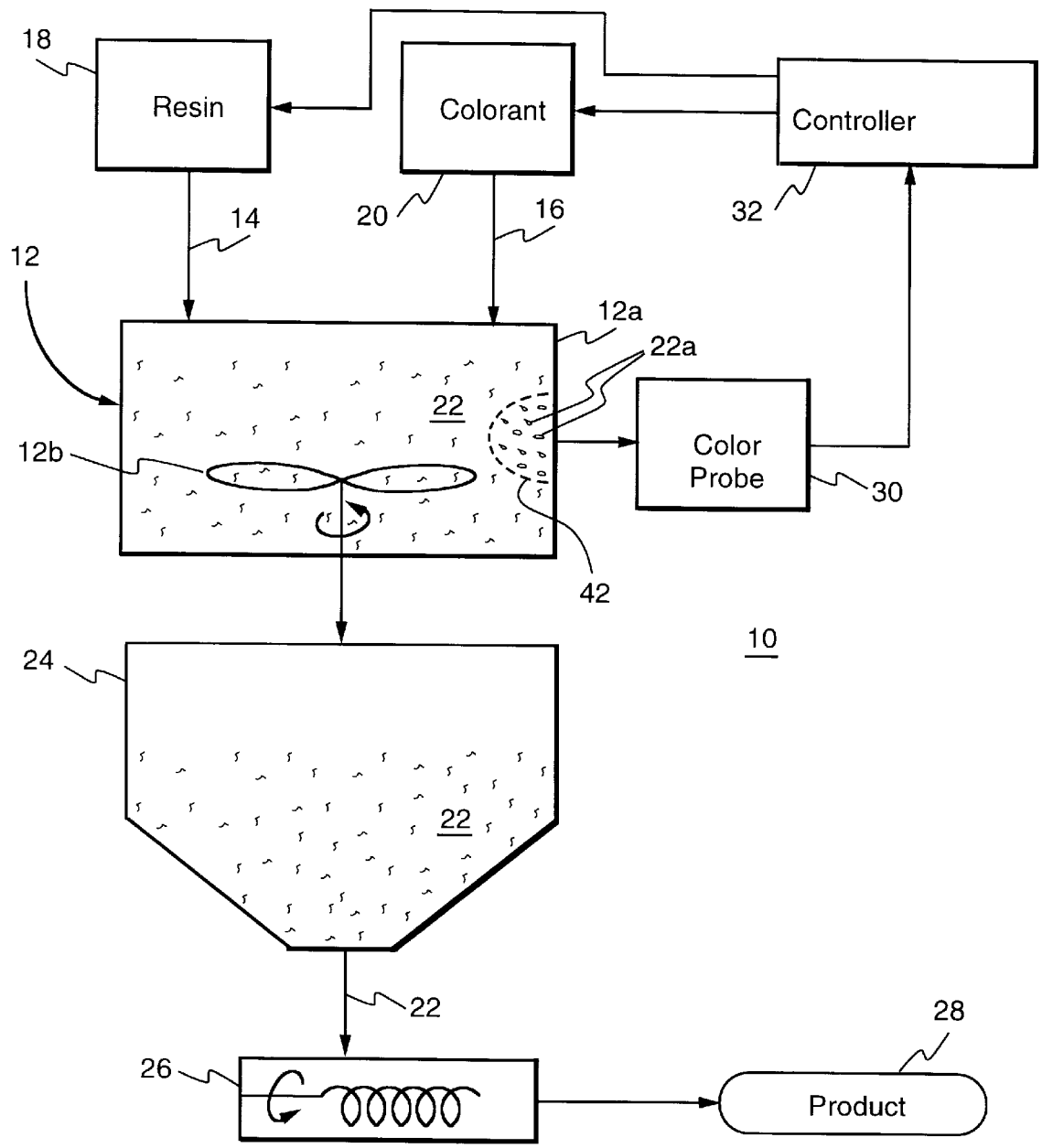
FIG. 1 is a schematic representation of an exemplary system for producing a polymer product from a base resin and colorant, including a color probe in accordance with an exemplary embodiment of the present invention.

Illustrated schematically in FIG. 1 is a polymer production system 10 in accordance with an exemplary embodiment of the present invention. System 10 includes a conventional blender 12 employing a vessel 12a for receiving and blending a conventional polymer base resin 14 with one or more conventional colorants 16.

A conventional resin dispenser 18 is operatively joined to blender 12 for selectively adding resin 14 thereto. A conventional colorant dispenser 20 is operatively joined to blender 12 for selectively adding colorant 16 thereto. Blender 12 also includes a suitable paddle or mixer 12b for blending together base resin 14 and colorant 16, and any additional additives as desired. The resulting mixture batch or blend 22 after suitable blending is temporarily stored in a holding bin 24 operatively joined to blender 12.

Holding bin 24 is operatively joined to a conventional compounder or extruder 26 which includes an extrusion screw that acts upon blend 22 delivered thereto to form, under heat, a polymer raw product 28 in any conventional form, such as pellets.

The raw product 28 is in turn used by various manufacturers to produce final products in various forms and configurations having the inherent color thereof. The color of the raw product is important in many final products requiring specific colors. Repeatability of accurate final product color requires repeatability in color of the raw product itself.

The color of raw product 28 may initially be manually adjusted by adjusting colorant 16 in an interactive process until the color of raw product 28 is within an acceptable range based on the reference plaque color. Sample plaques are formed as described above for measuring color thereof using conventional color sensors in the exemplary form of a spectrocolorimeter. Color measurement is usually made by reflecting light off the surface of the sample plaque and performing spectrum analysis thereof for determining color.

System 10, illustrated in FIG. 1, includes a color monitor or probe 30 in optical communication with blender 12 for measuring internal color of blend 22 itself, instead of measuring the color of raw product 28. After the blender has operated for a sufficient time to thoroughly mix resin 14 with colorant 16, blend 22 takes on a uniform color which is measurable by probe 30. In the embodiment of FIG. 1, blend 22 comprises a powder colored by the action of colorant 16. The powder is formed of individual small particles having irregular, three-dimensional surface contours. Probe 30, therefore, is optically joined to blender vessel 12a so as to cover the field of view of a probe zone portion 42 of blend 22 containing individual powder particles of blend 22. By accurately measuring the color of samples 22a of the powder particles, the color of blend 22 itself may be determined.

The measured color of blend 22 is used for controlling operation of system 10. To accomplish this, system 10 further includes a suitable controller 32 operatively coupled to both the resin and colorant dispensers 18 and 20, respectively, for controlling the ratio of colorant to resin in blend 22. Probe 30 is operatively coupled to controller 32 for varying the blend ratio of colorant to resin to control color of the blend in response to measured color of a sample 22a of the blend powder particles.

Controller 32 may take any conventional form such as a digitally programmable computer which compares a color signal from probe 30 to a reference signal for the desired color of blend 22 required for achieving a corresponding desired color of raw product 28. Controller 32 responds to deviation between the measured color of blend 22 and the desired color thereof by varying appropriate control valves (not shown) in resin dispenser 18 or colorant dispenser 20, or both, as required to control the color of blend 22. A closed-loop feedback control system may be implemented in suitable software within controller 32 for controlling operation of system 10 to achieve the desired color of blend 22 and product 28.

Figure 2:
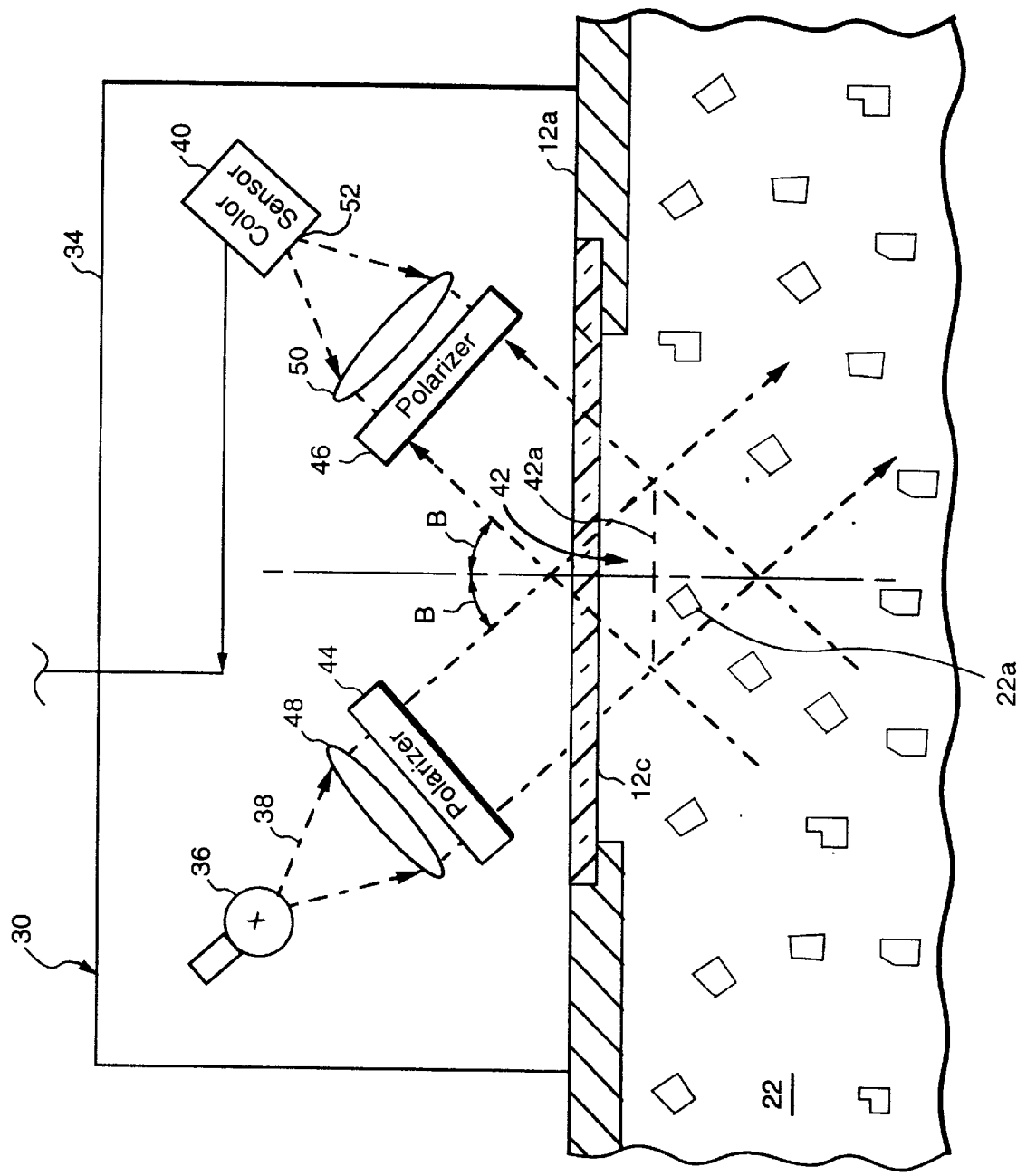
FIG. 2 is a schematic representation of the color probe illustrated in FIG. 1 in an exemplary embodiment.

A preferred embodiment of color probe 30, as illustrated in FIG. 2, includes a housing 34 suitably joined to blender vessel 12a. Blender 12 includes a suitable optically transparent window 12c in the wall of vessel 12a for permitting optical communication between probe 30 and blender 12. A suitable light source 36 is mounted in housing 34 for emitting and projecting an incident light beam 38 toward probe zone 42 inside blender 12. Light source 36 may be of any conventional form for use in measuring color of samples 22a, and, for example, may comprise a tungsten-halogen light source for producing broad spectrum white light.

A color sensor 40 is suitably mounted in housing 34 at an oblique angle with light source 36 and directed toward probe zone 42 containing blend powder particle samples 22a. Samples 22a are comprised of a substantial number of randomly oriented blend powder particles. Color sensor 40 may comprise, for example, any instrument which is effective for performing spectrum color analysis of incident light thereon, such as those commonly referred to as a spectrometer, spectrocolorimeter, or spectrophotometric colorimeter.

Light source 36 and color sensor 40 are optically aligned with a fixed reference plane 42a within probe zone 42 to effect angles of incidence and reflection relative thereto, each having a magnitude substantially equal to the conventionally known Brewster's maximum polarization angle B for the specific refractive index (n) of a specific sample 22a for measuring internal color thereof. As shown in FIG. 2, probe zone 42 is defined by both the viewing angle of color sensor 40 and the cooperating illumination angle of light source 36 within which one or more samples 22a are illuminated for color measurement by sensor 40. Light source 36 and color sensor 40 are simply mounted in housing 34 in a fixed spatial orientation to effect Brewster's angle viewing of samples 22a.

Figure 3:
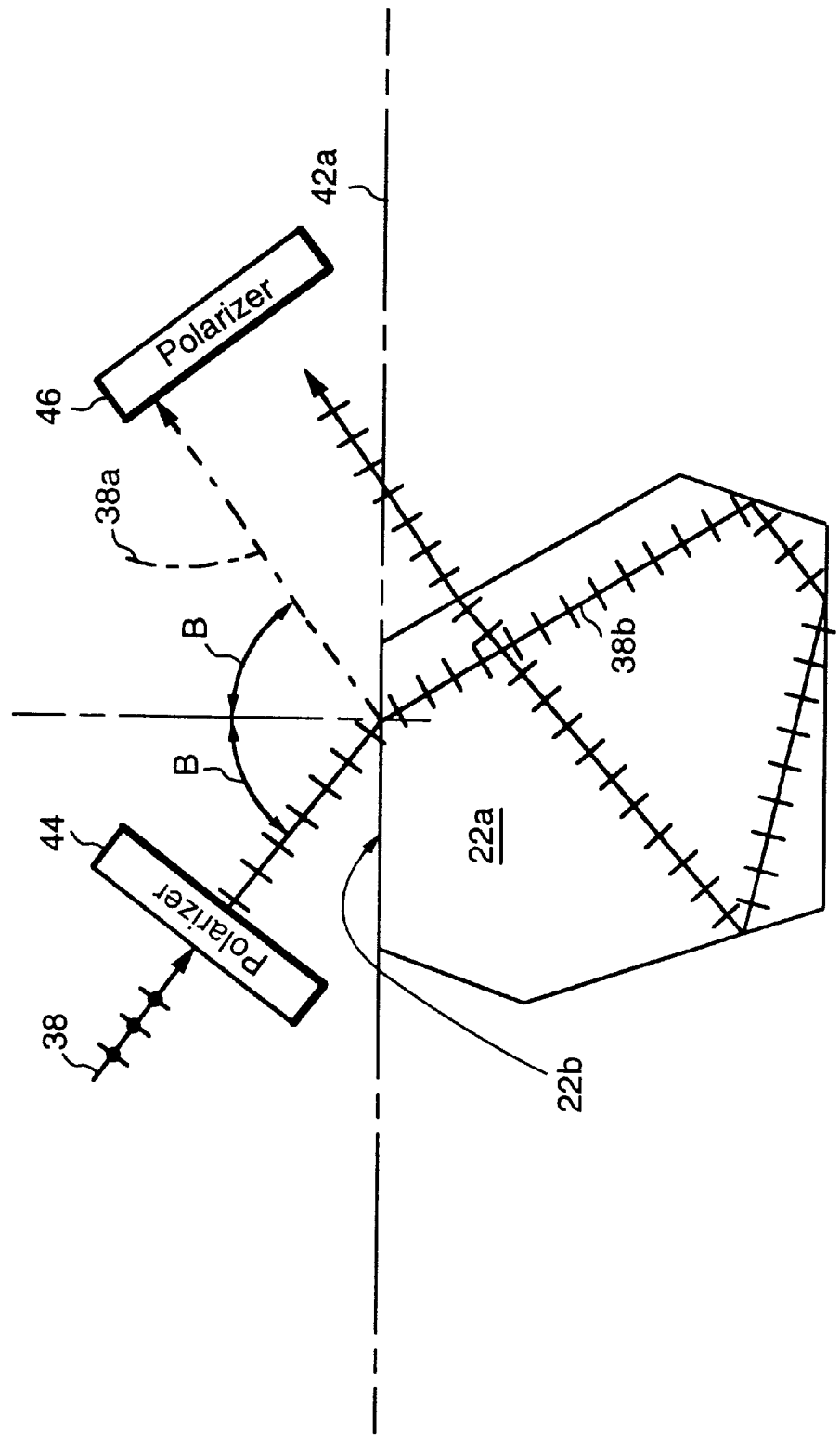
FIG. 3 is a schematic representation of light transmission through, and reflection from, a sample for measuring color thereof using the color probe of FIG. 2.

FIG. 3 is a schematic representation of light beam 38 illuminating an exemplary sample 22a to explain the principle of operation of color probe 30 in accordance with the present invention. Unpolarized light, such as light beam 38, when incident upon a sample surface, produces a reflected ray or wave 38a (shown in phantom), and a refracted ray or wave 38b. Incident light beam 38 is directed to have an angle of incidence B relative to the normal to reference plane 42a, and reflected wave 38a has an equal angle B of reflection relative thereto.

Reflected wave 38a undergoes plane-polarization when light is incident at Brewster's angle, since at that angle light vibrating in the plane of incidence is not reflected but is refracted into the material. Brewster's law provides that the angle of incidence for maximum polarization depends on the refractive index (n) of the material affected. Correspondingly, Brewster's angle B equals the arctangent of the refractive index (n) of sample 22a, which effects maximum polarization of light beam 38. For ordinary glass, Brewster's angle is about 570, whereas the specific composition of sample 22a has its own specific Brewster's angle.

Accordingly, light source 36 and color sensor 40 are preferably aligned relative to reference plane 42a to direct each of the incident and reflected light beams at the specific Brewster's angle B for the refractive index of sample 22a, such as the colored base resin of blend 22.

In FIG. 3, the unpolarized incident light beam 38 is schematically represented by a series of dots and crosslines representing the two mutually perpendicular plane-polarized components thereof, specifically, a perpendicular polarization ray or wave vibrating perpendicular to the plane of incidence, and a parallel polarization ray or wave vibrating in the plane of incidence, respectively.

Of those waves vibrating in the plane of incidence, one part is usually reflected and the remaining part is refracted for all angles, with the single exception of the Brewster polarizing angle for which all of the light is refracted. Of the wave vibrating perpendicular to the plane of incidence, some of the energy is reflected and the rest refracted for any angle of incidence. Thus, the refracted ray 38b usually contains some of both planes of polarization.

For a single surface of ordinary glass with a refractive index n=1.5, it has been shown that at the Brewster polarizing angle of 57°, 100 percent of the light vibrating parallel to the plane of incidence is transmitted, whereas for the perpendicular vibrations only 85 percent of the light is transmitted, the other 15 percent being reflected.

Accordingly, using the Brewster phenomena, light source 36 and color sensor 40 are specifically oriented to maximize the reception in color sensor 40 of refraction wave 38b after its journey through sample 22a, while minimizing the magnitude of reflection wave 38a. In this way, the internal color of sample 22a may be probed for obtaining a more accurate indication of the color of sample 22a, as opposed to probing the color of sample 22a from its surface only.

While FIG. 3 illustrates only a single sample 22a, in practice a large number of samples 22a will be within probe zone 42 in random orientations. Statistically, a suitable number of the individual samples 22a will include a reflection surface 22b aligned parallel with reference plane 42a for effecting Brewster angle viewing of those samples 22a. But for the Brewster angle alignment of light source 36, color sensor 40, and reflection surfaces 22b, light beam 38 could reflect from those surfaces directly into color sensor 40 (FIG. 2), which is undesirable. The Brewster angle condition minimizes collection of specular reflected light while maximizing collection of light initially refracted inside samples 22a before reaching sensor 40.

Recognizing the polarization effected in the Brewster angle operating condition, additional polarization may be effected to further reduce or eliminate reflected wave 38a. More specifically, in the embodiment illustrated in FIG. 2, a first linear polarization filter or polarizer 44 is optically aligned between light source 36 and probe zone 42 for selectively polarizing light beam 38 to prevent generation of reflection wave 38a from sample 22a, while permitting transmission of refraction wave 38b into sample 22a and, upon internal reflection therein, passing to sensor 40.

As can be seen in FIG. 3, unpolarized light beam 38 without polarizer 44 would contain components polarized perpendicular to the plane of incidence or reflection according to Brewster's law, and would generate reflection wave 38a. However, reflection wave 38a may be prevented by using first polarizer 44 specifically oriented therefor. In this condition, reflection wave 38a is illustrated in phantom indicating where it would exist but for polarizer 44 which prevents its transmission to color sensor 40 (FIG. 2).

The parallel polarization component of light beam 38 is unaffected by polarizer 44 and refracts inside sample 22a along the exemplary internal reflection path shown for refraction wave 38b. Statistically, many samples 22a will have internally reflected refraction waves 38b exiting the samples in the direction of color sensor 40 for measuring the internal color.

Refraction wave 38b is illustrated in FIG. 3 as reflecting internally off of multiple surfaces of sample 22a. In the usual case, the normals to these planes will not all lie in the same plane. In consequence of this three-dimensional orientation, and also the general laws of reflection, refraction wave 38b will undergo different polarizations in its travel. Refraction wave 38b may also scatter off of inclusions in sample 22a, further affecting its polarization.

Preferably, a second linear polarization filter or polarizer 46 may be optically aligned between probe zone 42 and color sensor 40 for transmitting refraction wave 38b to sensor 40 while blocking differently polarized components thereof, as well as for blocking reflection wave 38a from reaching sensor 40 and blocking light that is multiply scattered to small angles, with polarization rotation, from reaching sensor 40.

By choosing, the directions of illumination, observation, and polarization in accordance with Brewster's law, there is minimal direct surface reflection or scattering from samples 22a into the viewed direction monitored by color sensor 40. In this way, little or none of the light striking sample surfaces at Brewster's angle, with polarization, is reflected, but instead, most or all of the available light passes into the interior of samples 22a as refraction waves 38b where they can probe bulk color, with higher contrast and accuracy than conventional surface measuring color sensors.

The embodiment illustrated in FIG. 2 preferably includes a first collimating lens 48 optically aligned between light source 36 and first polarizer 44 for collimating light beam 38 toward probe zone 42. Correspondingly, a second lens 50 is optically aligned between second polarizer 46 and color sensor 40 for focusing collected light therefrom upon sensor 40. Sensor 40 preferably includes a pinhole or small slit inlet 52 sized to define a suitably narrow view direction corresponding to the volume of probe zone 42 to maintain viewing within narrow bounds of the Brewster angle B. Alternatively, an optical fiber might serve this purpose as well. In this way, probe zone 42 is illuminated with collimated light to maximize internal refraction within samples 22a while minimizing surface reflections therefrom, with refraction waves 38b leaving samples 22a and being statistically observed by use of directionally-oriented color sensor 40.

Color probe 30 thus allows highly accurate measurement of powder color by controlling the illumination and observation directions and polarizations so that direct reflections from the individual powder particles are minimized, allowing clearer detection of the interior color of the powder. The ability to measure the color of powder blend 22 in blender 12 and to make adjustments to the color for obtaining a desired final color for the extruded product 28 (FIG. 1) has many benefits. For example, the need to take a powder sample, run it through an off-line extruder, and form sample plaques in order to obtain a preliminary color measurement, will be eliminated, eliminating the need to maintain off-line equipment for this purpose and reducing the labor necessary to achieve an on-color blend. Furthermore, less material will be wasted or recycled because the number of off-color blends can be reduced. Extruder down-time while off-color blends are adjusted and brought into specification can also be reduced.

Although the blend color is not necessarily the same as the color of the produced raw product, there is a necessary correlation therebetween which allows the measurement of the blend color to determine the color of the extruded product 28.

These and other advantages of the invention are provided by the ability to measure interior color of samples 22a at the beginning of the manufacturing process when the raw materials are initially blended. Although the invention has been described with respect to this particular application, it may find utility in any application requiring accurate measurement of interior color of samples by refracting light therethrough. For example, light source 36 and color sensor 40 (FIG. 2) may be used with suitable optical transmission fibers for carrying the light to and from samples 22a. In this way either or both of the light source 36 and color sensor 40 may be remotely located using the Brewster angle configuration.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A probe for measuring color in a sample of material having a refractive index, comprising:

a light source for emitting a light beam toward said sample; and a color sensor for performing spectrum color analysis disposed at an oblique angle with said light source and directed toward a common probe zone containing said sample, said light source and said sensor being optically aligned with a reference plane in said probe zone to effect angles of incidence and reflection relative thereto having a magnitude substantially equal to Brewster's maximum polarization angle for said refractive index of said sample for measuring interior color of said sample.

2. A probe according to claim 1 further comprising a first polarizer optically aligned between said light source and probe zone for polarizing said light beam to minimize a reflection wave from said sample while permitting transmission of a refraction wave into said sample.

3. A probe according to claim 2 wherein said first polarizer comprises a linear polarizer.

4. A probe according to claim 3 further comprising a first lens for collimating said light beam toward said probe zone.

5. A probe according to claim 2 further comprising a second polarizer optically aligned between said probe zone and said sensor for transmitting said refraction wave from said sample to said sensor while blocking transmission of differently polarized light from said sample.

6. A probe according to claim 5 further comprising a second lens optically aligned between said second polarizer and said sensor for focusing collected light said second polarizer upon said sensor.

7. A probe for measuring color in a sample of material having a refractive index, comprising:
   a light source for emitting a light beam toward said sample;
   a color sensor disposed at an oblique angle with said light source and directed toward a common probe zone containing said sample, said light source and said sensor being optically aligned with a reference plane in said probe zone to effect angles of incidence and reflection relative thereto having a magnitude substantially equal to Brewster's maximum polarization angle for said refractive index of said sample for measuring interior color of said sample;
   a first polarizer optically aligned between said light source and probe zone for polarizing said light beam to minimize a reflection wave from said sample while permitting transmission of a refraction wave into said sample;
   a second polarizer optically aligned between said probe zone and said sensor for transmitting said refraction wave from said sample to said sensor while blocking transmission of differently polarized light from said sample;
   a second lens optically aligned between said second polarizer and said sensor for focusing collected light from said second polarizer upon said sensor;
   a blender for blending a base resin with a colorant seal to form a blend;
   a resin dispenser for adding said resin to said blender;
   a colorant dispenser for adding said colorant to said blender; and
   a controller operatively joined to said resin and colorant dispensers for controlling the ration of said colorant to said resin in said blend; and wherein
   said color probe is optically joined to said blender to position said probe zone therein for randomly receiving a portion of said blend to define said sample; and
   said color probe is operatively coupled to said controller for varying said ratio to control color thereof in response to measured color of said sample.

8. A method for measuring color in a sample of material having a probe zone therein and having a refractive index, comprising:
   projecting an incident light beam toward a reference plane within the probe zone of said sample at an angle of incidence to substantially effect Brewster's maximum polarization angle for the specific refractive index of said sample; and
   measuring internal color of said sample through spectrum color analysis at about Brewster's maximum polarization angle relative to a normal to said reference plane for a light wave refracted through said sample from said incident light beam.

9. A method according to claim 8 further comprising polarizing said incident light beam to minimize a reflection wave from said sample, while permitting transmission of a refraction wave into said sample.

10. A method for measuring color in a sample of material having a probe zone therein and having a refractive index, comprising:
   projecting an incident light beam toward a reference plane within the probe zone of said sample at an angle of incidence to substantially effect Brewster's maximum polarization angle for the specific refractive index of said sample;
   measuring color of said sample at about Brewster's maximum polarization angle relative to a normal to said reference plane for a light wave refracted through said sample from said incident light beam;
   polarizing said incident light beam to minimize a reflection wave from said sample while permitting transmission of a refraction wave into said sample;
   blending a base resin with a colorant to form a blend;
   controlling the ratio of said colorant to said resin in said blend;
   measuring color of a portion of said blend as said sample; and
   varying said ratio to control blend color in response to the measured color of said sample.

* * * * *